(12) United States Patent
Horst et al.

(10) Patent No.: US 12,690,580 B1
(45) Date of Patent: Jul. 28, 2026

(54) BRACKETS FOR TREE STANDS

(71) Applicant: ARDISAM, INC., Cumberland, WI (US)

(72) Inventors: Jeremy Horst, Lino Lakes, MN (US); Cooper Bredlau, Menominee, WI (US); Michael Furseth, Cumberland, WI (US)

(73) Assignee: ARDISAM, INC., Cumberland, WI (US)

( * ) Notice: Subject to any disclaimer, the term of this patent is extended or adjusted under 35 U.S.C. 154(b) by 0 days.

(21) Appl. No.: 19/224,469

(22) Filed: May 30, 2025

(51) Int. Cl.
*A01M 31/02* (2006.01)
*F16M 13/02* (2006.01)

(52) U.S. Cl.
CPC .......... *A01M 31/02* (2013.01); *F16M 13/022* (2013.01)

(58) Field of Classification Search
CPC .............................. A01M 31/02; F16M 13/022
See application file for complete search history.

(56) References Cited

U.S. PATENT DOCUMENTS

| | | | | |
|---|---|---|---|---|
| 5,507,362 A | * | 4/1996 | Krueger | A63B 27/00 |
| | | | | 182/187 |
| 5,848,666 A | * | 12/1998 | Woodall | A01M 31/02 |
| | | | | 182/187 |
| 6,065,722 A | * | 5/2000 | LeVasseur | F21V 21/08 |
| | | | | 248/230.8 |
| 6,170,609 B1 | * | 1/2001 | Dech | E06C 1/381 |
| | | | | 182/189 |
| 6,397,973 B1 | * | 6/2002 | Woller | A01M 31/02 |
| | | | | 182/135 |
| 6,866,120 B1 | * | 3/2005 | Butterworth | A01M 31/02 |
| | | | | 182/135 |
| 7,174,995 B1 | * | 2/2007 | Alexander | A01M 31/02 |
| | | | | 182/187 |
| 8,181,743 B2 | * | 5/2012 | duCellier | A01M 31/02 |
| | | | | 182/187 |
| 8,302,922 B1 | * | 11/2012 | Robinson | A47G 25/08 |
| | | | | 248/219.4 |
| 8,789,653 B2 | * | 7/2014 | Priest | A01M 31/02 |
| | | | | 182/100 |
| 8,991,555 B2 | * | 3/2015 | Furseth | E06C 7/48 |
| | | | | 182/187 |
| 8,997,933 B2 | * | 4/2015 | Furseth | A01M 31/02 |
| | | | | 264/630 |

(Continued)

*Primary Examiner* — Brian D Mattei
*Assistant Examiner* — Kathleen M. McFarland
(74) *Attorney, Agent, or Firm* — PERKINS COIE LLP

(57) ABSTRACT

A bracket system for a tree stand at least partially supports the tree stand on a support structure. A bracket system may include a bracket element and at least one strap receiving element attached to, or attachable to, the bracket element. The bracket element may include at least one structural engagement portion positionable to engage the support structure and a tree-stand engagement portion that may include at least one tree-stand engagement element for receiving a portion of the tree stand. The tree-stand engagement element may include a slot, and the portion of the tree stand may include a rod extending from the tree stand and configured to be retained in the slot. When a tree stand is engaged to the bracket system, the tree stand may be deployed (unfolded) in a manner that leverages against the support structure and pulls a strap of the bracket system against the support structure.

22 Claims, 5 Drawing Sheets

(56)                References Cited

U.S. PATENT DOCUMENTS

| | | | | |
|---|---|---|---|---|
| 9,027,709 | B2 * | 5/2015 | Wheelington | A01M 31/02 |
| | | | | 182/129 |
| 9,057,202 | B2 * | 6/2015 | Berkbuegler | E04G 3/00 |
| 9,204,628 | B2 * | 12/2015 | Priest | A01M 31/02 |
| 9,232,783 | B2 * | 1/2016 | Blackwell | A01M 31/02 |
| 9,458,644 | B1 * | 10/2016 | Russell | E04H 15/04 |
| 10,653,129 | B2 * | 5/2020 | Check | A01M 31/02 |
| 10,791,729 | B1 * | 10/2020 | Power, II | F16M 13/02 |
| 10,883,655 | B1 * | 1/2021 | Rowton | F16M 11/105 |
| 10,973,224 | B2 * | 4/2021 | Infalt | E06C 1/38 |
| 11,154,048 | B2 * | 10/2021 | Power, II | E06C 1/381 |
| 11,284,614 | B1 * | 3/2022 | Hauser | A01M 31/02 |
| 11,317,622 | B2 * | 5/2022 | Power, II | A01M 31/02 |
| 11,564,387 | B2 * | 1/2023 | Haakenson | A01M 31/02 |
| 11,655,936 | B2 * | 5/2023 | Klopfenstein | F16M 13/022 |
| | | | | 248/205.1 |
| 11,779,009 | B2 * | 10/2023 | Infalt | E06C 1/34 |
| | | | | 182/187 |
| 11,971,062 | B2 * | 4/2024 | Tsorng | F16M 13/02 |
| 12,208,312 | B2 * | 1/2025 | D'Acquisto | A63B 27/00 |
| 2005/0039985 | A1 * | 2/2005 | Butterworth | A01M 31/02 |
| | | | | 182/187 |
| 2006/0054397 | A1 * | 3/2006 | Pringnitz | A01M 31/02 |
| | | | | 182/187 |
| 2007/0205344 | A1 * | 9/2007 | Liermann | F16M 13/02 |
| | | | | 248/217.3 |
| 2007/0261919 | A1 * | 11/2007 | Roe | A01M 31/02 |
| | | | | 182/187 |
| 2008/0236948 | A1 * | 10/2008 | duCellier | A01M 31/02 |
| | | | | 182/187 |
| 2011/0308887 | A1 * | 12/2011 | Johnson | A01M 31/02 |
| | | | | 182/187 |
| 2012/0080267 | A1 * | 4/2012 | Furseth | E06C 7/48 |
| | | | | 182/115 |
| 2012/0080269 | A1 * | 4/2012 | Furseth | A01M 31/02 |
| | | | | 164/113 |
| 2012/0168249 | A1 * | 7/2012 | Furseth | A01M 31/02 |
| | | | | 182/115 |
| 2012/0199418 | A1 * | 8/2012 | Priest | A01M 31/02 |
| | | | | 182/187 |
| 2014/0138185 | A1 * | 5/2014 | Samona | A01M 31/02 |
| | | | | 182/187 |
| 2014/0190767 | A1 * | 7/2014 | Wheelington | A01M 31/02 |
| | | | | 182/187 |
| 2015/0034419 | A1 * | 2/2015 | Blackwell | A01M 31/02 |
| | | | | 119/28.5 |
| 2018/0192634 | A1 * | 7/2018 | Check | A01M 31/02 |
| 2019/0055782 | A1 * | 2/2019 | Infalt | E06C 1/381 |
| 2020/0305412 | A1 * | 10/2020 | Power, II | F16M 11/38 |
| 2021/0169067 | A1 * | 6/2021 | Power, II | F16B 2/08 |
| 2021/0186000 | A1 * | 6/2021 | Haakenson | A01M 31/02 |
| 2021/0187356 | A1 * | 6/2021 | D'Acquisto | E06C 1/381 |
| 2021/0204538 | A1 * | 7/2021 | Power, II | A01M 31/02 |
| 2022/0195802 | A1 * | 6/2022 | D'Acquisto | E06C 9/02 |
| 2023/0107767 | A1 * | 4/2023 | Klopfenstein | F16M 13/022 |
| | | | | 248/205.1 |
| 2023/0151841 | A1 * | 5/2023 | Tsorng | F16M 13/02 |
| | | | | 248/221.12 |
| 2023/0241458 | A1 * | 8/2023 | D'Acquisto | E06C 1/34 |
| | | | | 182/189 |
| 2023/0270101 | A1 * | 8/2023 | Lovich | A01M 31/02 |
| | | | | 182/187 |

* cited by examiner

BRACKETS FOR TREE STANDS

BACKGROUND

Conventional tree stands for hunting or other outdoor activities are typically attached to a support structure (e.g., a tree) in an elevated position above ground via one or more straps and one or more blades or jaws. Such tree stands may be called "hang on" tree stands because they hang on to the support structure. The blades or jaws secure the tree stand along the vertical axis of the support structure when the straps are tightened such that the straps draw the blades or jaws against the support structure and increase friction between the blades or jaws and the support structure (e.g., by the blades or jaws impressing or digging into the support structure, or by otherwise creating sufficient friction to support the tree stand).

Conventional tree stands may suffer from several drawbacks. For example, a user may have difficulty creating sufficient tension in the straps for drawing the blades or jaws against the support structure, resulting in insufficient friction against the support structure for safely supporting the user. This difficulty may be amplified when a support structure is not completely straight or level to the ground, so a conventional tree stand may be useful only with trees that are sufficiently straight and vertical. Some existing tree stands may be attached to a bracket that is in turn mounted to a tree, but those existing tree stands risk instability because the bracket is the point of contact with the tree, and there is no direct engagement between the tree stand and the tree.

Aspects of embodiments of the present technology address these drawbacks and other drawbacks.

SUMMARY

Representative embodiments of the present technology include a bracket system for a tree stand. The bracket system at least partially supports the tree stand on a support structure. The bracket system may include a bracket element and at least one strap receiving element attached to, or attachable to, the bracket element. The bracket element may include at least one structural engagement portion positionable to engage the support structure and a tree-stand engagement portion that may include at least one tree-stand engagement element for receiving a portion of the tree stand. The tree-stand engagement element may include a slot, and the portion of the tree stand may include a rod extending from the tree stand and configured to be retained in the slot. When a tree stand is engaged to the bracket system, the tree stand may be deployed (e.g., unfolded) in a manner that leverages the tree stand against the support structure and tightens or pulls a strap of the bracket system against the support structure.

Other features and advantages will appear hereinafter. The features described herein can be used separately or together, or in various combinations of one or more of them.

BRIEF DESCRIPTION OF THE DRAWINGS

In the drawings, wherein the same reference number indicates the same element throughout the several views.

DETAILED DESCRIPTION

The present technology is directed to brackets for tree stands, and associated systems and methods, that enable a user to quickly and reliably install a tree stand on a support structure (e.g., for observation and/or hunting). Various embodiments of the technology will now be described. The following description provides specific details for a thorough understanding and enabling description of these embodiments. One skilled in the art will understand, however, that the invention may be practiced without many of these details. Additionally, some well-known structures or functions (such as structures or functions commonly associated with tree stands) may not be shown or described in detail to avoid unnecessarily obscuring the relevant descriptions of the various embodiments. Accordingly, embodiments of the present technology may include additional elements or exclude some of the elements described below with reference to FIGS. 1-7, which illustrate examples of the technology.

The terminology used in this description is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Numerical adjectives including "first" and "second," or the like, as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. As used herein, the terms "generally" and "approximately" refer to values or characteristics within a range of ±10% from the stated value or characteristic, unless otherwise indicated. For purposes of the present disclosure, a first element that is positioned "toward" an end of a second element is positioned closer to that end of the second element than to a middle or mid-length location of the second element.

Figure 1:
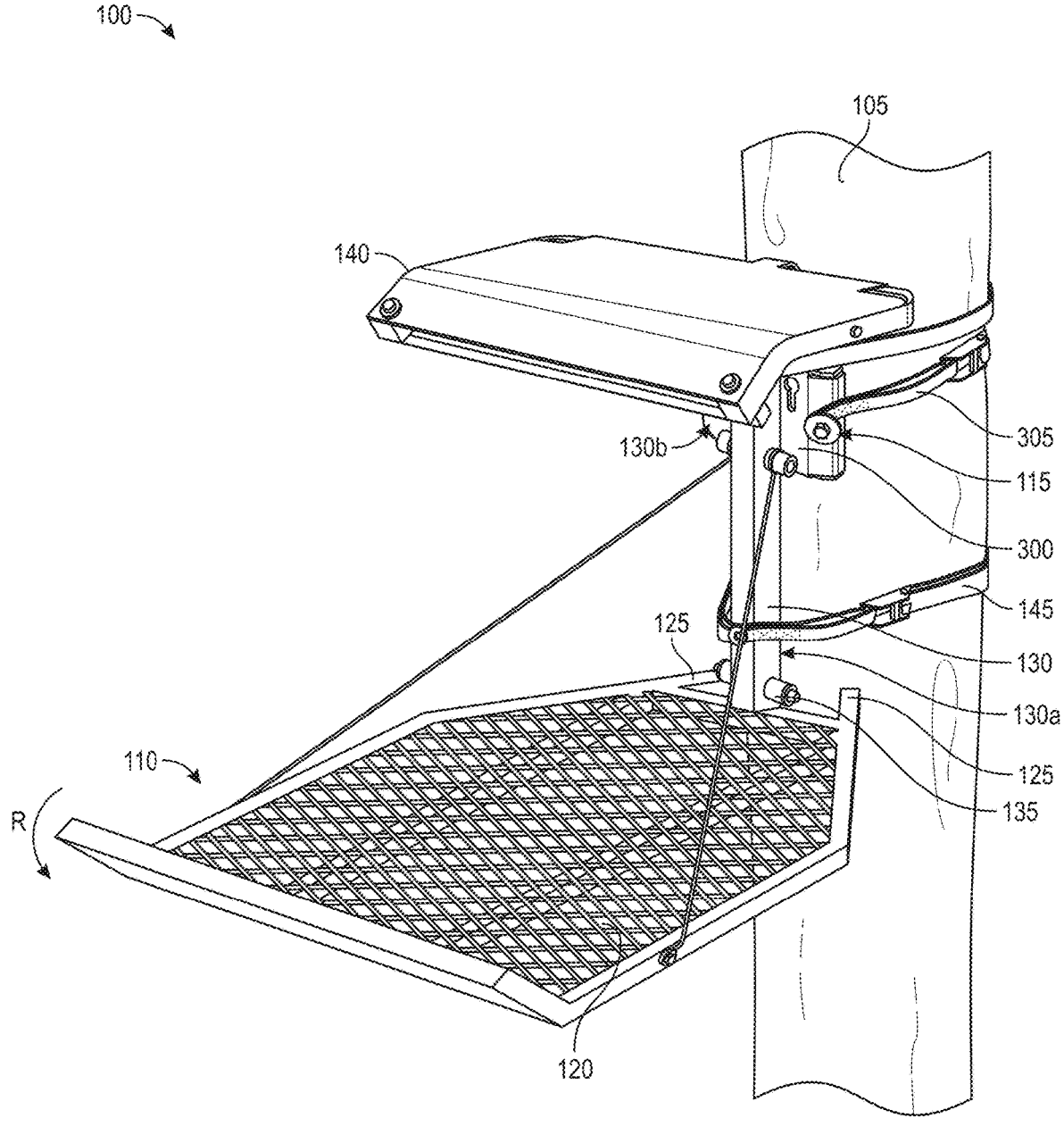
FIG. 1 illustrates a perspective view of a tree stand system configured in accordance with embodiments of the present technology and attached to a support structure (e.g., a tree)

FIG. 1 illustrates a perspective view of a tree stand system 100 configured in accordance with embodiments of the present technology and attached to a support structure 105

(e.g., a tree). The tree stand system 100 may include a tree stand 110 and a bracket system 115 configured to at least partially support the tree stand 110 on the support structure 105. As will be described in further detail below, the bracket system 115 facilitates installation and removal of the tree stand 110 from the support structure 105 via, in part, a releasable connection between the tree stand 110 and the bracket system 115 and by tension applied to the bracket system 115 when the tree stand 110 is deployed.

Figure 2:
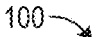
FIG. 2 illustrates a perspective view of a portion of the tree stand system shown in FIG. 1, just prior to the tree stand being connected to a bracket system or just after the tree stand has been disconnected from the bracket system, according to embodiments of the present technology.
Figure 2:
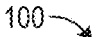

The tree stand 110 may include one or more components similar to components of known tree stands, such as: a platform 120; one or more first structure engagement portions 125 attached to or as part of the platform 120; a post 130 pivotably connected to the platform 120 at a first end 130a of the post 130 via a pivot joint 135; an optional secondary platform 140 (e.g., a seat, railing, shelf, etc.), which may be pivotably or fixedly connected to a second end 130b of the post 130 distal from the first end 130a; and one or more second structure engagement portions 210 attached to the optional secondary platform 140 or the post 130. The second structure engagement portion(s) 210 is not visible in FIG. 1, but is illustrated in FIG. 2 and described in further detail below. The first structure engagement portion 125 or the second structure engagement portion 210 may include, for example, one or more blades, prongs, jaws, or other structures suitable for providing friction or other suitable engagement between the platform 120 and the support structure 105 to at least partially support the tree stand 110 along the support structure 105.

FIG. 2 illustrates a perspective view of a portion of the tree stand system 100 just prior to the tree stand 110 being connected to the bracket system 115 or just after the tree stand 110 has been disconnected from the bracket system 115, according to embodiments of the present technology. In some embodiments, the tree stand 110 may include a mounting element 200 for engaging the bracket system 115. For example, the mounting element 200 may include a rod or bolt extending or projecting rearwardly from the tree stand 110 (e.g., from the post 130) for releasably engaging the bracket system 115 through a recess or opening 205 in the bracket system 115. The second structure engagement portion 210 is shown as being attached to the post 130 but, in other embodiments, it may be attached to the secondary platform 140.

As can be seen by comparing FIG. 1 (in which the tree stand 110 is deployed) with FIG. 2 (in which the tree stand 110 is generally folded or in at least a partially stowed configuration), and as described in additional detail below, rotating the platform 120 when the mounting element 200 is engaged with the bracket system 115 causes the structure engagement portions 125, 210 to press against the support structure 105. The bracket system 115 provides a force tending to pull the tree stand 110 toward the support structure 105 (via the mounting element 200 of the tree stand 110 in tensioned engagement with the bracket system 115 via the opening 205 of the bracket system 115) while the structure engagement portions 125, 210 tend to press toward the support structure 105, which puts a tension in the overall system that stabilizes the tree stand 110 against the support structure 105. The bracket system 115 functions to connect the tree stand 110 to the support structure 105 via a strap (e.g., a strap 305 described below), while the tree stand 110 maintains multiple direct points of contact with the support structure 105 via the structure engagement portions 125, 210. When the platform 120 is rotated, it acts as a lever that drives at least the first structure engagement portion(s) 125 into/against the support structure 105.

Figure 3:
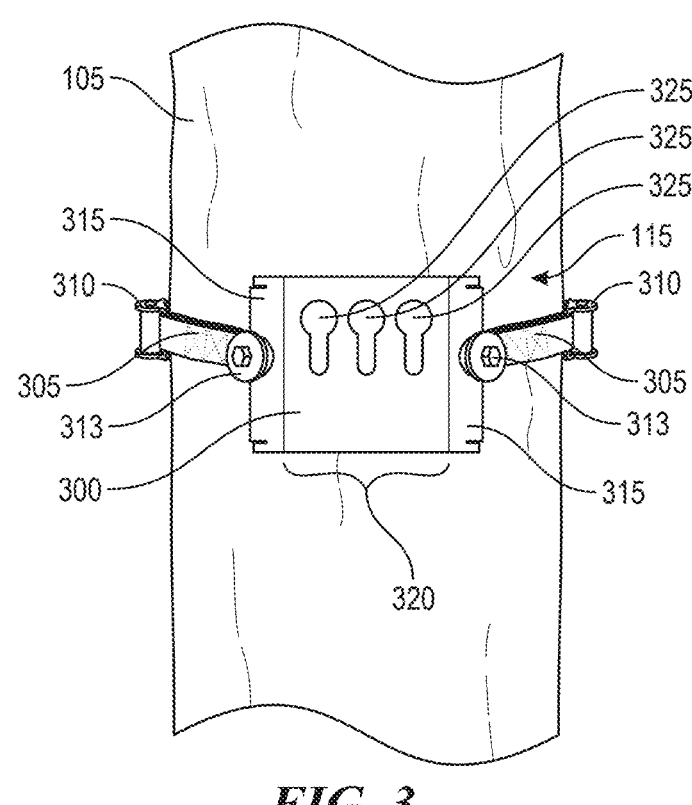
FIG. 3 illustrates a front view of the bracket system configured in accordance with embodiments of the present technology and attached to the support structure.

FIG. 3 illustrates a front view of the bracket system 115 configured in accordance with embodiments of the present technology and attached to the support structure 105. In some embodiments, the bracket system 115 may include a bracket element 300, one or more straps 305 (which may include multiple segments connected together or a single integral strap), one or more strap tensioning devices 310 (e.g., a ratchet, buckle, clamp, D-ring, etc.) for cinching the one or more straps 305 around the support structure 105, and one or more (e.g., two) strap receiving elements 313 attached to (or attachable to) the bracket element 300 for connecting the one or more straps 305 to the bracket element 300. The one or more straps 305 and the optional strap tensioning devices 310 restrain the bracket element 300 to the support structure 105.

In some embodiments, the one or more strap receiving elements 313 may be attachable to one or more corresponding strap receiving portions 315 (e.g., sides) of the bracket element 300, which may optionally have faces that are angled relative to other portions of the bracket element 300, as described in additional detail below. The bracket element 300 may further include a tree-stand engagement portion 320 for receiving a portion of the tree stand 110 to connect the tree stand 110 to the bracket element 300. For example, the tree-stand engagement portion 320 may include one or more tree-stand engagement elements 325 for receiving or otherwise connecting the bracket element 300 to the mounting element 200 (see FIG. 2). In some embodiments, the one or more tree-stand engagement elements 325 may include one or more of the openings 205 (e.g., one or more slots, each of which may have an elongated portion and a wider rounded portion in communication with the elongated portion, such as a keyhole shape, or other suitable openings) or other recesses or openings suitable for engaging the bracket element 300 with a portion of the tree stand 110 (such as the mounting element 200).

Figure 4:
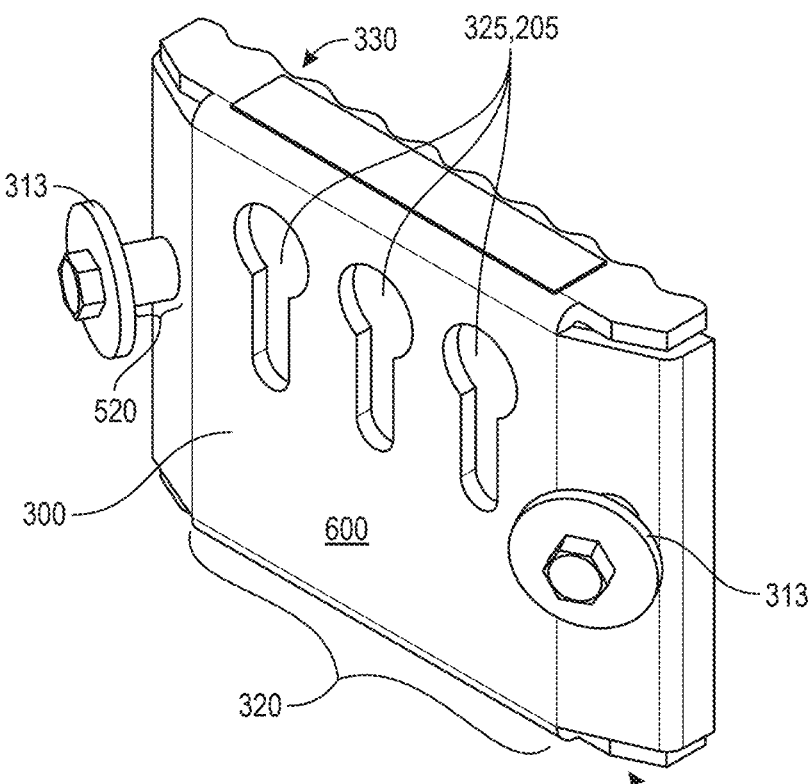
FIG. 4 illustrates a perspective view of a portion of the bracket system, configured in accordance with embodiments of the present technology.

FIG. 4 illustrates a perspective view of a portion of the bracket system 115, configured in accordance with embodiments of the present technology. In some embodiments, the bracket element 300 includes one or more structural engagement portions 330 for engaging the support structure 105 (e.g., by pressing into the support structure 105 when the bracket system 115 is cinched to the support structure 105). The structural engagement portions may include a contoured surface or a plurality of teeth, ridges, serrations, or other suitable elements for engaging a tree or other support structure 105. Although only one structural engagement portion 330 is visible in FIG. 4, another structural engagement portion may be positioned on the opposite side of the bracket element 300 in a similar manner and with a similar structure.

General operation of the bracket system 115 in the tree stand system 100 will now be described with reference to FIGS. 1-4. In some embodiments, a user may pass the one or more straps 305 around the support structure 105, attach the one or more straps 305 to the bracket element 300 (e.g., by looping a portion of the one or more straps 305 around each of the strap receiving elements 313), and cinch or tighten the one or more straps 305 and the bracket element 300 around the support structure 105 (e.g., via the one or more strap tensioning devices 310). At that point, the structural engagement portions 330, along with the one or more straps 305, may generally support the bracket system 115 on the support structure 105. To further secure the bracket system 115, in some embodiments, a user may push or kick downwards on the bracket element 300, which may have the effect of further tightening and tensioning the bracket system 115 against the support structure 105, and which may cause the structural engagement portions 330 to dig into the support structure 105 to further increase engagement with the support structure 105.

Next, a user may position the mounting element 200 (e.g., the rod or bolt attached to the tree stand 110) to engage the bracket element 300 via (e.g., through) one of the tree stand engagement elements 325 (e.g., a recess or opening 205) of the bracket element 300. For example, in some embodiments, when the mounting element 200 has a wide head connected to a shaft (e.g., if the mounting element 200 is a bolt), the head may go into a wider portion of the opening 205 and slide down into a narrower portion of the opening 205, such that the head is restrained on one side of the bracket element 300 and the tree stand 110 is supported on the bracket element 300. In some embodiments, with specific reference to FIG. 2, the user may position the mounting element 200 in the opening 205 while the tree stand 110 is in a generally folded configuration, in which at least the first structure engagement portion(s) 125 are not yet engaged with the support structure 105.

With the tree stand 110 supported on the bracket system 115, a user may deploy the tree stand 110 by unfolding it. A user may rotate the platform 120 away from the support structure 105 along arrow R in FIGS. 1 and 2. As is evident from comparing the configuration in FIG. 2 with the deployed/mounted configuration in FIG. 1, when the platform 120 is rotated, it acts as a lever that drives the first structure engagement portion(s) 125 into the support structure 105. This also tends to pull the bracket element 300 away from the support structure 105, which further increases the tension in the one or more straps 305.

Concurrently, the second structure engagement portion 210 may also be forced against the support structure 105 in the same manner due to the geometry of the tree stand 110. Referring to FIG. 1, the tree stand 110 is now mounted and engaged with the support structure 105 with its structure engagement portions 125, 210 supporting the tree stand 110 above the ground, and the one or more straps 305 maintaining tension between the tree stand 110 and the support structure 105 (via the bracket element 300 and the mounting element 200, see FIG. 2). In some embodiments, the tree stand system 100 may further include one or more additional straps 145 for providing additional force for pulling the structure engagement portions 125, 210 against the support structure 105 or for further stability.

Figure 5:
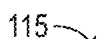
FIG. 5 illustrates a partially exploded perspective view of a portion of the bracket system.

FIG. 5 illustrates a partially exploded perspective view of a portion of the bracket system 115. In some embodiments, the strap receiving elements 313 can include a shaft 500 and a shoulder 505 that is wider than the shaft 500. Each shaft 500 may be attached to (or attachable to) a corresponding strap receiving portion 315 of the bracket element 300 via a suitable connection, such as a fastener 510 extending through the strap receiving element 313, which may be secured to threads in the bracket element 300 or a nut 515 on an opposite side of the bracket element 300. The shoulders 505 may be spaced apart from the corresponding strap receiving portions 315 of the bracket element 300 to form a strap receiving area 520 (see also, FIG. 4) that receives a loop or other portion of the one or more straps 305 (see FIGS. 1 and 3). In some embodiments, the strap receiving elements 313 can include a shoulder washer. In some embodiments, the shaft 500 may be omitted and the fastener 510 may support a washer, such that the washer forms the shoulder 505.

In some embodiments, bracket element 300 includes multiple tree-stand engagement elements 325 (e.g., the openings 205) distributed laterally across the bracket element 300 (e.g., across the tree stand engagement portion 320). For example, as shown in FIG. 5, the bracket element 300 may include three tree-stand engagement elements 325, although other embodiments may include more or fewer tree-stand engagement elements 325. Having multiple tree-stand engagement elements 325 distributed across different positions on the bracket element 300 enables a user to choose a tree-stand engagement element 325 that provides the most stability for a given use or support structure 105 (e.g., to accommodate mounting on a crooked tree). In some embodiments, three tree-stand engagement elements 325 may span twelve degrees around a support structure 105 for adjustment within such a range, or the bracket element 300 may have other suitable dimensions.

Figure 6:
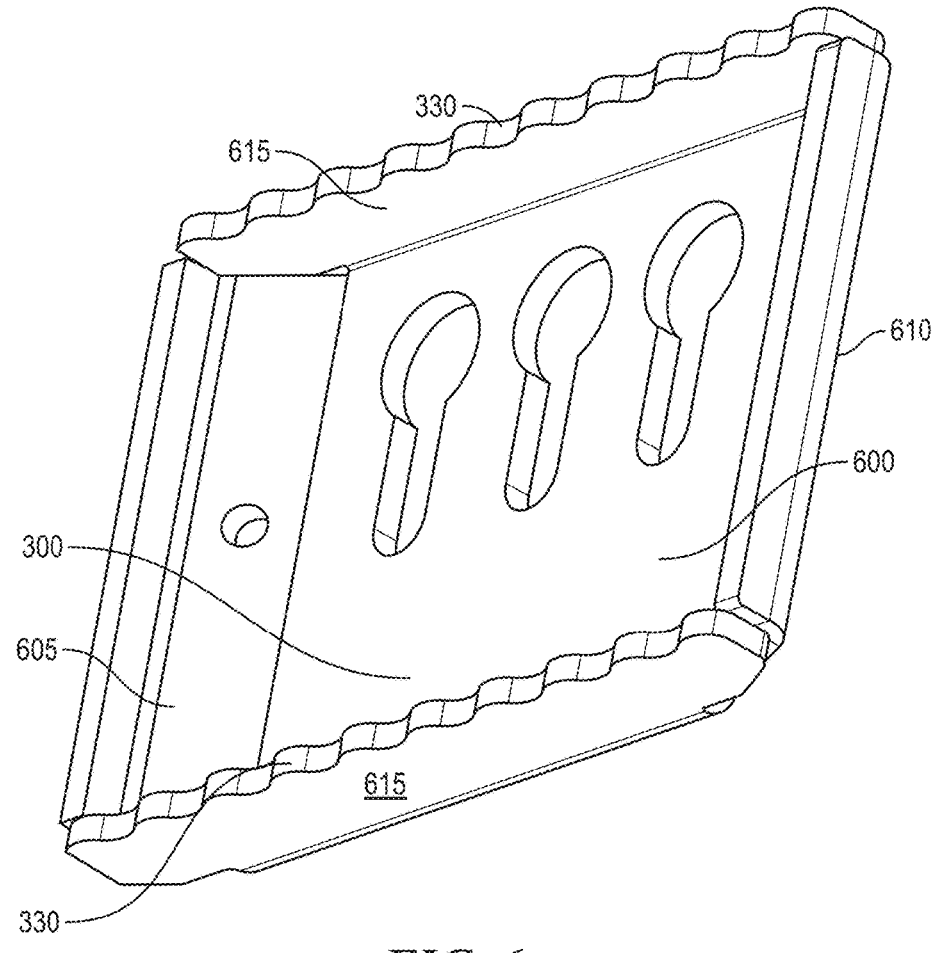
FIG. 6 is a rear perspective view of the bracket element.
Figure 7:
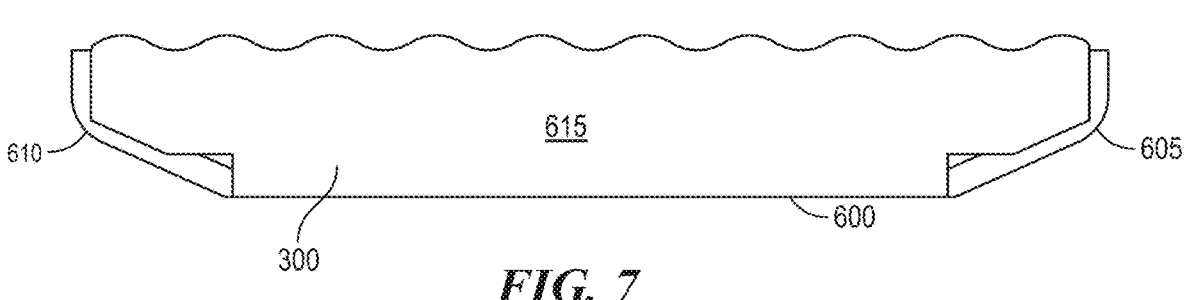
FIG. 7 is a top view of the bracket element.

FIG. 6 is a rear perspective view of the bracket element 300. FIG. 7 is a top view of the bracket element 300. With reference to at least FIGS. 4-7, in some embodiments, the bracket element 300 includes, or is formed from, a plurality of panels positioned transversely relative to each other. In some embodiments, the bracket element 300 comprises a single body bent to form the plurality of panels (e.g., a metal plate bent to form the bracket element 300, or multiple bent metal plates attached together). In some embodiments, the bracket element 300 may be cast or machined.

In some embodiments, the bracket element 300 includes a first panel 600 that includes the tree-stand engagement portion 320, a second panel 605 that extends transversely from the first panel 600 and includes a strap receiving portion 315, and a third panel 610 that extends transversely from the first panel 600 and includes another strap receiving portion 315. The first panel 600 may be positioned between the second panel 605 and the third panel 610. In some embodiments, the bracket element 300 may further include one or more fourth panels 615 (e.g., two fourth panels 615, which may be referred to as upper and lower panels) extending transversely (e.g., rearwardly) from at least the first panel 600. Each of the one or more fourth panels 615 may include one or more of the structural engagement portions 330. The first panel 600, the second panel 605, and the third panel 610 may be deemed "front panels" because they form front sides of the bracket element 300.

Components of embodiments of the present technology may include any materials or construction suitable for bearing loads, resisting outdoor elements, or portability. For example, the bracket element 300 may include metal, a durable plastic, or another material suitable for repeated stress and engagement with other components.

Embodiments of the present technology provide several additional advantages over conventional technology. The geometric arrangement of the tree stand 110 and the bracket system 115 allows a user to generate tension in the strap(s) 305 by deploying the platform 120 (i.e., pivoting the platform 120 to the deployed position, along the general path illustrated with the arrow R in FIGS. 1 and 2). This tension provides stability in the assembly especially when the support structure 105 is not straight. A bracket element with multiple tree stand engagement elements 325 (e.g., multiple openings 205) may provide side-to-side adjustability. A user may leave a bracket system 115 mounted to a support structure 105 when removing the tree stand 110 for easily returning and re-attaching the tree stand 110 at another time. A user may position multiple bracket systems 115 on one or more support structures 105 and bring the tree stand 110 to any of the desired sites where the bracket systems have been installed. In some embodiments, having the single contact between the bracket element 300 and the mounting element 200 helps minimize noise during assembly and mounting.

From the foregoing, it will be appreciated that specific embodiments of the presently disclosed technology have been described herein for purposes of illustration, but that various modifications may be made without deviating from the scope of the technology. For example, the shapes of components illustrated in the figures are only representative of some embodiments, and other embodiments may have other shapes, sizes, or configurations.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A bracket system for at least partially supporting a tree stand on a support structure, the bracket system comprising a bracket element and two strap receiving elements, wherein the bracket element comprises:

a first panel, wherein the first panel comprises a tree-stand engagement portion, wherein the tree-stand engagement portion comprises a tree-stand engagement element for receiving a portion of the tree stand;

a second panel extending transversely from the first panel and directly attached to the first panel, wherein the second panel comprises a first strap receiving portion for engaging or receiving a first strap receiving element of the two strap receiving elements;

a third panel extending transversely from the first panel and directly attached to the first panel, wherein the third panel comprises a second strap receiving portion for engaging or receiving a second strap receiving element of the two strap receiving elements; and at least one structural engagement portion positionable to engage the support structure;

wherein:

each of the first panel, the second panel, and the third panel is planar;

the first panel is positioned between the second panel and the third panel;

for the first strap receiving element of the two strap receiving elements, the first strap receiving element comprises a shaft and a shoulder, the shoulder is wider than the shaft, the shaft is attached to, or attachable to, the first strap receiving portion; and when the shaft is attached to the first strap receiving portion, the shoulder is spaced apart from the first strap receiving portion to form a strap receiving area between the shoulder and the bracket element.

2. The bracket system of claim 1, further comprising a means for restraining the bracket element to the support structure.

3. The bracket system of claim 2, wherein the means for restraining the bracket element to the support structure comprises a strap.

4. The bracket system of claim 3, wherein the means for restraining the bracket element to the support structure further comprises a strap tensioning device.

5. The bracket system of claim 4, wherein the strap tensioning device comprises at least one of: a ratchet, a buckle, a clamp, or a D-ring.

6. The bracket system of claim 1, wherein the shoulder comprises a shoulder washer.

7. The bracket system of claim 1, wherein the at least one structural engagement portion comprises at least one of: a contoured surface, plurality of teeth, or a plurality of ridges.

8. The bracket system of claim 1, wherein the tree-stand engagement element comprises an opening for receiving the portion of the tree stand.

9. The bracket system of claim 8, wherein the opening comprises a slot.

10. The bracket system of claim 9, wherein the slot comprises an elongated portion and a rounded portion in communication with the elongated portion.

11. The bracket system of claim 8, wherein the opening comprises a keyhole shape.

12. The bracket system of claim 1, wherein the tree-stand engagement element comprises three tree-stand engagement elements, wherein each tree-stand engagement element comprises a slot configured to receive the portion of the tree stand.

13. The bracket system of claim 7, wherein the at least one structural engagement portion extends along a plane orthogonal to an intersection between the first panel and the second panel.

14. The bracket system of claim 1, wherein:

the bracket element further comprises one or more fourth panels extending transversely from the first panel;

the one or more fourth panels extend transversely relative to the second panel and the third panel; and the one or more fourth panels comprise the at least one structural engagement portion.

15. The bracket system of claim 1, wherein the bracket element comprises a single body bent to form the first panel, the second panel, and the third panel.

16. A tree stand system comprising:

a tree stand, wherein the tree stand comprises a platform, a lower structure engagement portion attached to the platform and extending rearwardly relative to the platform, a post pivotally connected to the platform toward a lower end of the post, an upper structure engagement portion attached to the post toward an upper end of the post opposite the lower end, and a mounting element projecting rearwardly from the post between the lower end of the post and the upper end of the post; and a bracket system, wherein the bracket system is configured to support the tree stand on a support structure;

wherein:

the bracket system comprises a bracket element, a strap, a strap tensioning device, and two strap receiving elements, wherein the two strap receiving elements are attached to the bracket element or attachable to the bracket element;

the bracket element comprises a structural engagement portion and a tree-stand engagement portion, wherein the structural engagement portion is positionable to engage the support structure, and wherein the tree-stand engagement portion comprises a tree-stand engagement element for receiving the mounting element of the tree stand;

the bracket element comprises one or more front panels, an upper panel extending transversely and rearwardly from the one or more front panels, and a lower panel extending transversely and rearwardly from the one or more front panels;

the one or more front panels comprise the tree-stand engagement portion and are configured to support the two strap receiving elements; and the upper panel or the lower panel comprises the structural engagement portion, and the tree-stand engagement element comprising a slot in the one or more front panels.

17. The tree stand system of claim 16, further comprising two additional slots in the one or more front panels for receiving the mounting element of the tree stand.

18. The tree stand system of claim 16, wherein the bracket element comprises a single body bent to form the one or more front panels, the upper panel, and the lower panel.

19. The tree stand system of claim 16, wherein each strap receiving element of the two strap receiving elements comprises a shaft and a shoulder, wherein the shoulder is wider than the shaft, and wherein the shaft is attached to, or attachable to, the one or more front panels to form a strap receiving area between the shoulder and the one or more front panels.

20. A bracket system for supporting a tree stand on a support structure, the bracket system comprising:

a bracket element, a strap, a strap tensioning device attached to the strap for adjusting tension in the strap, and two strap receiving elements extending from the bracket element for receiving the strap, wherein:

the bracket element comprises a front panel positioned between a first side panel extending from the front panel and a second side panel extending from the front panel, an upper panel extending rearwardly from the front panel and transversely relative to the first side panel and the second side panel, and a lower panel extending rearwardly from the front panel and transversely relative to the first side panel and the second side panel;

the upper panel comprises an upper structural engagement portion for engaging a surface of the support structure;

the lower panel comprises a lower structural engagement portion for engaging the surface of the support structure;

a first strap receiving element of the two strap receiving elements comprises a first shaft and a first shoulder attached to the first shaft, wherein the first shaft is attached to the first side panel and extends forwardly from the first side panel, and wherein the first shoulder is spaced apart from the bracket element to form a first strap receiving area;

a second strap receiving element of the two strap receiving elements comprises a second shaft and a second shoulder attached to the second shaft, wherein the second shaft is attached to the second side panel and extends forwardly from the second side panel, wherein the second shoulder is spaced apart from the bracket element to form a second strap receiving area;

a first end of the strap comprises a first loop positionable over the first shoulder and in the first strap receiving area;

a second end of the strap comprises a second loop positionable over the second shoulder and in the second strap receiving area; and the front panel comprises a plurality of openings for receiving and restraining a portion of the tree stand, wherein each opening of the plurality of openings comprises a slot having an elongated portion and a rounded portion wider than the elongated portion.

21. The bracket system of claim 20, wherein:

at least one of the first side panel or the second side panel is spaced apart from the upper panel to form an upper gap therebetween; and at least one of the first side panel or the second side panel is spaced apart from the lower panel to form a lower gap therebetween.

22. A bracket system for at least partially supporting a tree stand on a support structure, the bracket system comprising a bracket element and two strap receiving elements, wherein the bracket element comprises:

a first panel, wherein the first panel comprises a tree-stand engagement portion, wherein the tree-stand engagement portion comprises an opening for receiving a portion of the tree stand;

a second panel extending transversely from the first panel and directly attached to the first panel, wherein the second panel comprises a first strap receiving portion for engaging or receiving a first strap receiving element of the two strap receiving elements;

a third panel extending transversely from the first panel and directly attached to the first panel, wherein the third panel comprises a second strap receiving portion for engaging or receiving a second strap receiving element of the two strap receiving elements; and at least one structural engagement portion positionable to engage the support structure;

wherein each of the first panel, the second panel, and the third panel is planar; and wherein the first panel is positioned between the second panel and the third panel.

* * * * *